Sept. 29, 1936.  R. M. HARDGROVE  2,055,722
FUEL BURNER
Filed June 21, 1932  3 Sheets-Sheet 1

INVENTOR
Ralph M. Hardgrove
BY
ATTORNEY

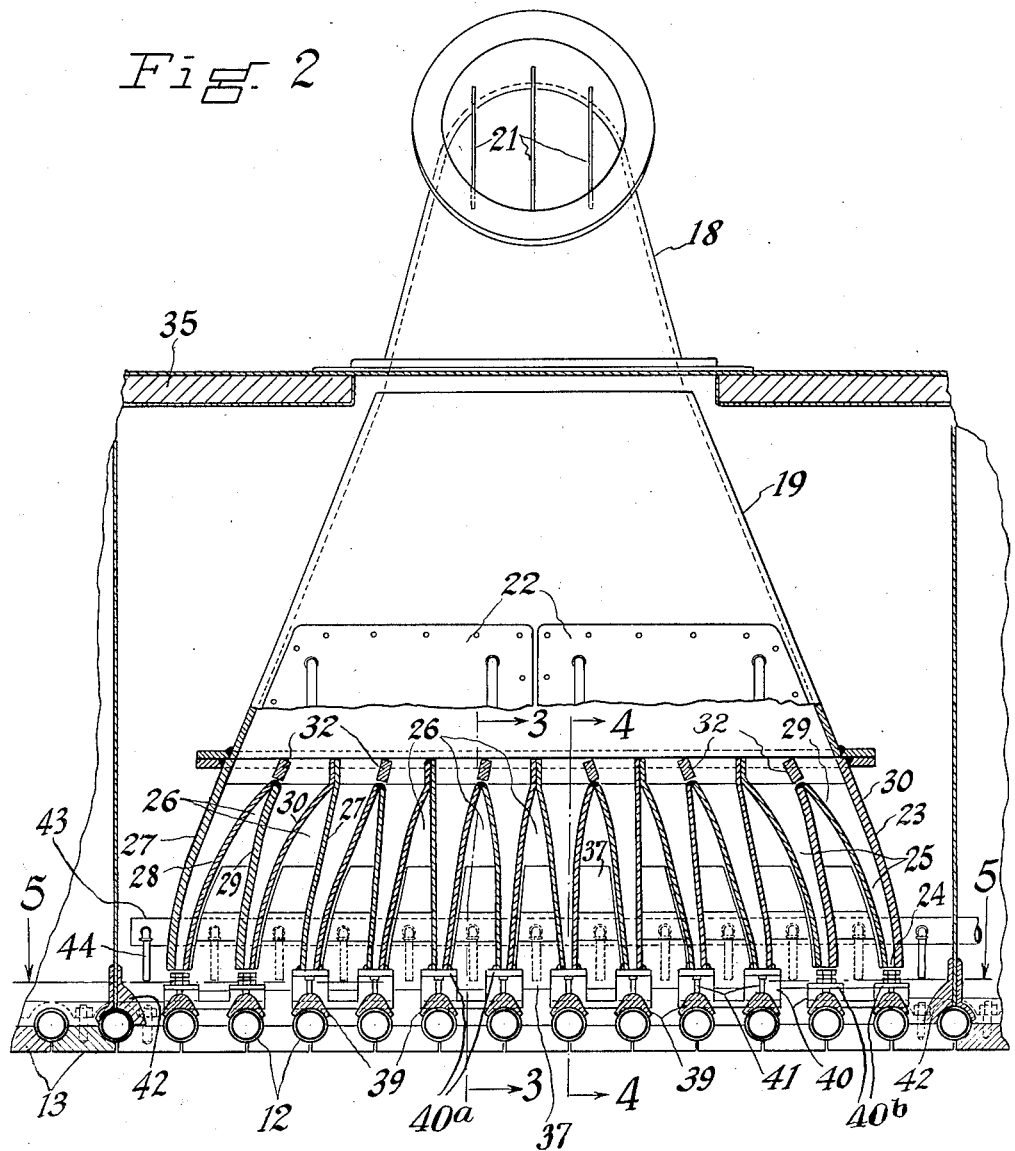

Sept. 29, 1936.     R. M. HARDGROVE     2,055,722
FUEL BURNER
Filed June 21, 1932     3 Sheets-Sheet 3
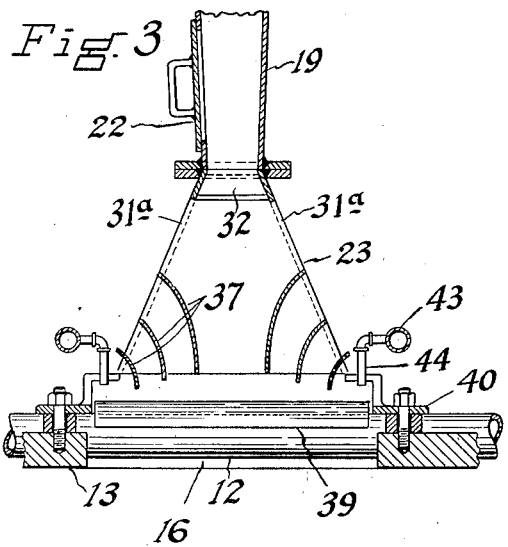
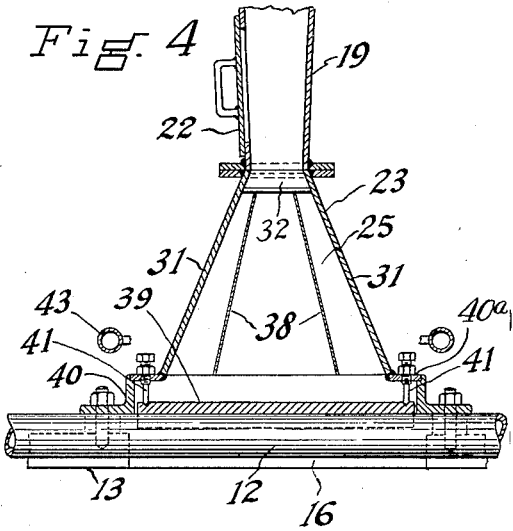
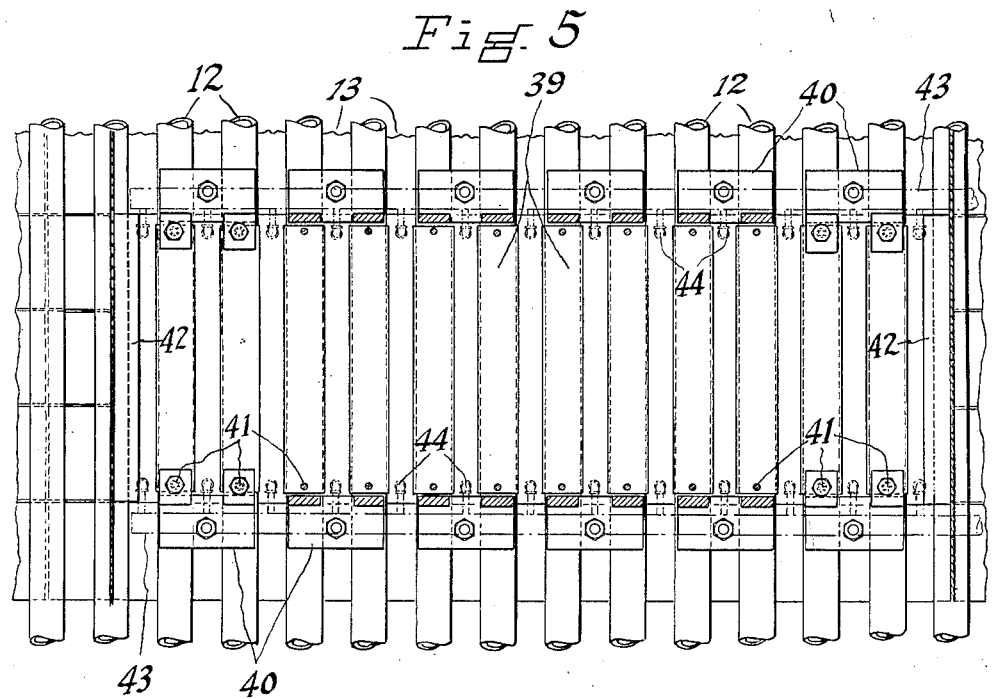
INVENTOR
Ralph M. Hardgrove
BY
ATTORNEY

Patented Sept. 29, 1936

2,055,722

UNITED STATES PATENT OFFICE 2,055,722

FUEL BURNER

Ralph M. Hardgrove, Westfield, N. J., assignor to The Babcock & Wilcox Company, Bayonne, N. J., a corporation of New Jersey Application June 21, 1932, Serial No. 618,444

14 Claims. (Cl. 110—104)

My present invention relates to the construction and operation of fuel burners adapted for use with a fluid fuel in either a pulverulent or gaseous condition.

The general object of my invention is the provision of a high capacity short flame fuel burner which is characterized by an improved construction and arrangement for effecting a thorough mixing of the fuel and combustion air. A further and more specific object of my invention is the provision of an improved fuel burner of the character described especially adapted for use with pulverized fuel in a furnace having its walls cooled by spaced fluid conduit elements.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 2 is an elevation of a preferred form of fuel burner with parts broken away and in section;

Fig. 3 is a section on the line 3—3 of Fig. 2;

Fig. 4 is a section on the line 4—4 of Fig. 2; and

Fig. 5 is a section on the line 5—5 of Fig. 2.

Figure 1:
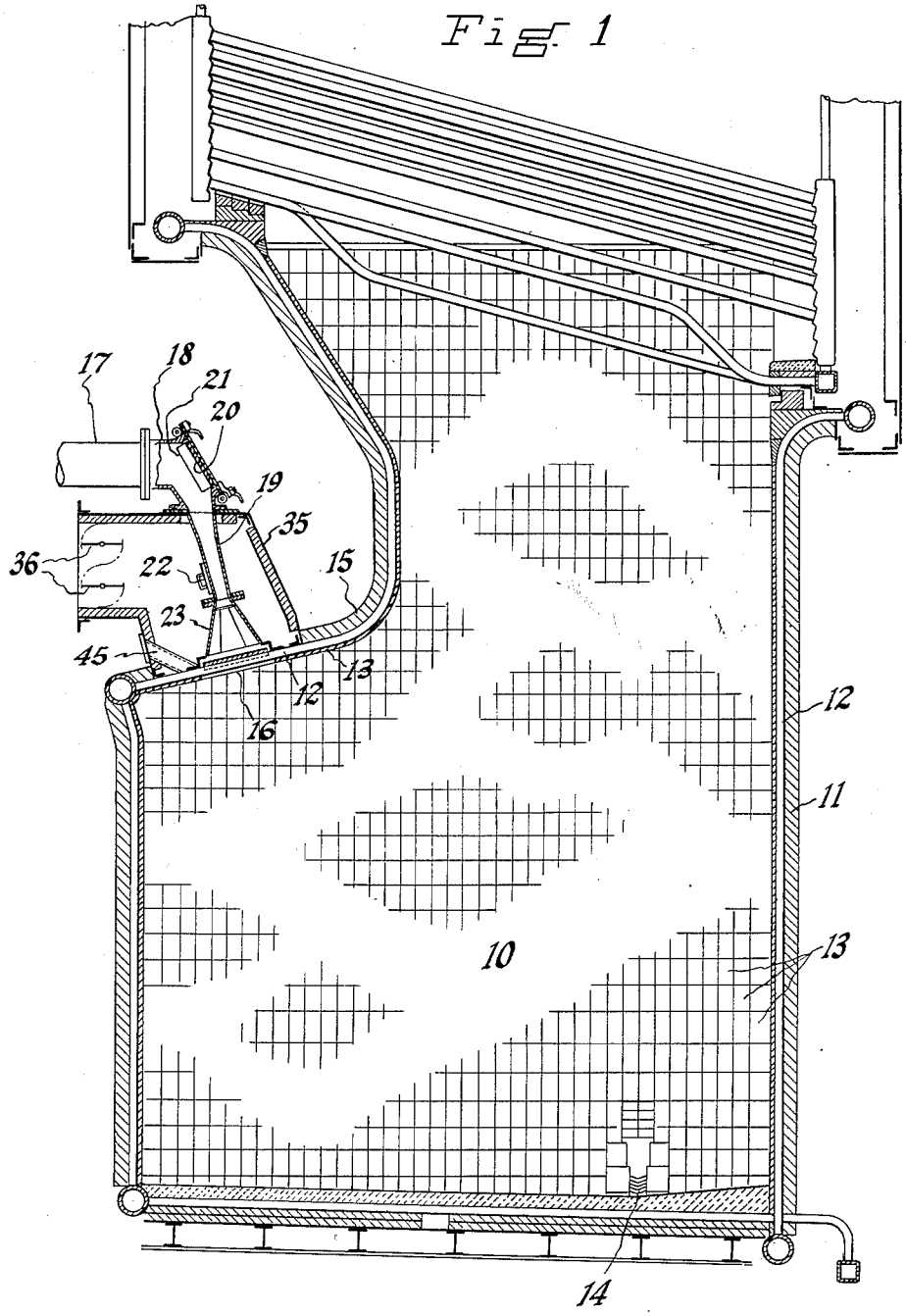
Fig. 1 is a sectional elevation of a steam boiler provided with fuel burners constructed in accordance with my invention.

My improved fuel burner is illustrated in conjunction with a high capacity furnace 10 formed by walls 11, lined with spaced cooling fluid tubes 12, and serving as the combustion chamber of a steam boiler of the Babcock and Wilcox type, into the circulating system of which the wall cooling tubes are connected. The tubes 12 are covered with blocks 13 of heat resistant material in a well known manner. The furnace shown is formed with a slag collecting bottom, from which slag is tapped out at intervals through a slag tap opening 14. My improved burner is preferably located in a horizontal or inclined portion of the furnace walls.

In the construction shown, the tubes in an inclined portion of the furnace arch 15 have their blocks 13 omitted to provide a burner port 16 of substantially rectangular form, across which the tubes extend, as shown in Figs. 1, 2 and 5. The provision for effecting a discharge of a combustible fuel and air mixture through the spaces between the tubes extending across the burner port includes a supply pipe 17 connected with a suitable source of fuel, such as gas or pulverized coal, and connected by an elbow conduit 18 to a vertically arranged distributing conduit 19. The elbow 18 has a hinged deflector plate 20 forming its wall portion opposite the end of the pipe 17 for directing the fuel towards the inlet end of the conduit 19. To control the flow of fuel, and particularly to offset any tendency of the fuel to concentrate along the side walls of the elbow, the deflector plate 20 is formed with several plates 21 normal thereto and extending along its length. As shown in Figs. 1 and 2, the inlet end of the elbow is of circular cross-section, and its outlet portion is of diverging rectangular cross-section and connected to the inlet end of conduit 19.

The burner conduit 19 diverges similarly to the outlet portion of the elbow 18, and slightly tapers in height towards its discharge end. Access doors 22 are provided in one side of the conduit 19. The conduit terminates in a diverging tip member 23, from which the fuel or fuel and air mixture introduced through the pipe 17 is discharged through a plurality of horizontally spaced elongated discharge openings 24 arranged slightly above the tubes 12 and with their discharge axes substantially normal to and intersecting the longitudinal axes of corresponding tubes 12. The discharge openings 24 are at the lower end of discharge nozzles or channels 25 tapering in width, diverging lengthwise and progressively increasing in curvature away from the center line of the burner. The channels 25 are formed by adjacent plates of diverging air passages or chambers 26 having open lower ends registering with the spaces between the adjacent tubes 12.

The burner tip member is preferably formed by a plurality of assembled sections, each section consisting of four plates, 27, 28, 29 and 30 of trapezoidal form, and pairs of inclined end plates 31, which with the plates 27 and 28, and 29 and 30, respectively, form the nozzles 25 therebetween, and the plates 28 and 29 of each section being inclined and welded together at their upper ends to form the intermediate air passage 26. The weld along the upper edges of these plates is protected by wear bars 32, arranged thereabove. The tip sections are assembled with the upper portions of the plates 27 and 30 of adjacent sections in contact. The plates forming the outer sides of the outer nozzles 25 are preferably thicker than those forming the inner sides, in view of the greater wear to which the former are subjected.

The burner and port are surrounded by a casing 35 connected to a suitable source of air for combustion, the amount of which entering the casing 35 is regulable, for example, by dampers 36. The casing 35 is illustrated as supported on tubes 12 along the sides of the burner port. Communication is established between the casing 35 and the air passages 26 by registering ports 31ᵃ between the end plates 31. With a diverging form of burner tip and the air from the casing 35 entering at opposite ends of the air passages, the air tends to concentrate along the middle portion thereof, resulting in excess air at the middle of the burner port and insufficient air near its ends. To avoid such a condition, curved vanes 37 are inserted in the air passages, as shown in Fig. 3, causing a change in direction of the air and a substantially uniform distribution of the air throughout the area of the burner port. As shown in Fig. 4, a substantially uniform distribution of the fuel in the diverging discharge nozzles 25 is secured by the use of oppositely inclined plates 38.

When a mixture of primary or carrier air and pulverized fuel is delivered to the pipe 17, the fuel particles enter the burner conduit 19 with little or no stratification, due to the action of the deflector plate 20 and fins 21, and are uniformly distributed throughout the area of the discharge nozzles 25. To prevent erosion of the portions of the tubes 12 directly below the discharge slots 24, and to effect a lateral dispersal of the fuel streams discharged therefrom, elongated tube protector members 39 of suitable wear resisting material are arranged on the upper sides of the tubes 12. The tube protectors are held in position by screw bolts 41 mounted in brackets 40 clamped on the tubes 12 as shown in Figs. 3 and 4. As shown in Figs. 2–5, the four intermediate pairs of brackets 40 have projecting flange portions 40$^a$ welded to the nozzle plates 31 and support the burner nozzles, while the end pairs of brackets have flange portions 40$^b$ extending only part of the height of the portions 40$^a$ and do not engage the burner nozzles. The streams of fuel or fuel and air discharged through the openings 24 impact against the tube protectors 39 and are dispersed laterally into the air stream on each side thereof. A thorough mixing of the fuel and air is effected in the spaces between the tubes before the mixture enters the furnace 10. The projection of the fuel particles into the adjacent air streams insures a mixing action substantially independent of the velocity of the secondary air stream, which varies with the boiler load. This mixing of the fuel and air prior to entering the furnace permits the use of a minimum amount of excess air and a rapid combustion of the mixture on entering the furnace. Due to the equal tube spacing across the burner port, the mixture will enter the furnace in parallel homogeneous streams at substantially the same velocity. Since the intertube spaces at the sides of the burner port receive only approximately half the amount of fuel as the others, the effective discharge area of these spaces is advantageously reduced by enlarged clamping members 42, as shown in Fig. 2. A furnace lighting port 45 is arranged adjacent the inner side of the burner port.

If, in operation, plastic fuel particles tend to accumulate on the blocks 13 along the ends of the burner port and obstruct the discharge of fuel, such accumulations may be removed by the operation of a high pressure fluid jet system 43 having discharge nozzles 44 arranged to discharge through the intertube spaces adjacent the ends of the burner slot, as shown.

The burner construction described is particularly adapted for use with pulverized fuel when arranged in a substantially vertical position. When so arranged, the flow of fuel through the nozzles is aided by the gravital effect on the fuel. Accumulation of fuel in the burner nozzles and the consequent danger of premature explosions is also avoided after the fuel supply apparatus is shut down. The tubes 12 afford adequate protection to the exposed burner parts and the tube protectors from the radiant heat of the furnace.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. The combination with a furnace wall having a burner port formed therein and a plurality of fluid heating tubes spaced across said port, of a fuel burner arranged to discharge through said port and comprising a diverging tip member having a plurality of spaced fuel discharge nozzles formed therein and terminating in elongated discharge openings spaced from and with their longitudinal axes parallel with the axes of corresponding tubes, an air supply casing surrounding said tip member and communicating with the spaces between said tubes, and means for effecting a substantially uniform distribution of fuel throughout said discharge nozzles.

2. The combination with a furnace wall having a burner port therein and a plurality of fluid heating tubes spaced across said port, of a fuel burner arranged to discharge through said port and comprising a diverging tip member having a plurality of spaced fuel dischage nozzles formed therein and terminating in elongated discharge openings spaced from and with their longitudinal axes parallel with the axes of corresponding tubes, an air supply casing surrounding said tip member and communicating with the spaces between said tubes, and means for effecting a substantially uniform distribution of air from said casing throughout the spaces between said tubes.

3. The combination with an approximately horizontally arranged furnace wall having a burner port therein and a plurality of fluid conduit tubes spaced across said port, of a vertically arranged fuel burner arranged to discharge downwardly through said port and comprising a diverging tip member having a plurality of spaced fuel discharge nozzles formed therein and terminating in elongated discharge openings above and with their longitudinal axes parallel with the axes of corresponding tubes, and an air supply casing surrounding said tip member and communicating with the spaces between said tubes.

4. The combination with an approximately horizontally arranged furnace wall having a rectangular burner port therein and a plurality of fluid conduit tubes spaced across said port, of a vertically arranged pulverized fuel burner arranged to discharge downwardly through said port and comprising a diverging tip member having a plurality of spaced fuel discharge nozzles formed therein and terminating in elongated discharge openings above and with their longitudinal axes parallel with the axes of corresponding tubes, an air supply casing surrounding said tip member and communicating with the spaces between said tubes, tube protectors on the fuel burner side of said tubes arranged to receive the impact of the fuel discharged through said discharge openings, means for distributing the fuel throughout the length of said discharge nozzles, and means aiding in the distribution of air from said casing throughout the length of the spaces between said tubes.

5. The combination with a furnace wall having a burner port formed therein, of a fuel burner arranged to discharge through said port and comprising a tip member having a plurality of fuel discharge nozzles spaced across said port, a plurality of fuel dispersal devices spaced across said port and directly in front of the discharge ends of corresponding discharge nozzles, an air supply casing associated with said tip member and arranged to discharge streams of air through the spaces between said dispersal devices, means for shielding said dispersal devices and tip member from the radiant heat of the furnace, and cleaning fluid jet discharge means arranged to discharge along marginal portions of said burner port.

6. The combination with a furnace wall having a burner port formed therein, of a fuel burner tip member having a plurality of fuel discharge nozzles spaced across said port, a plurality of fuel dispersal devices spaced across said port and directly in front of the discharge ends of corresponding discharge nozzles, an air supply casing associated with said tip member and arranged to discharge streams of air through the spaces between said dispersal devices, and means for supplying pulverized fuel to said tip member including a bent conduit portion having a deflector plate on the outer side of said bend and blades on said plate arranged to prevent lateral dispersion of the fuel impacting on said plate.

7. The combination with a furnace wall having a burner port formed therein, of pulverized fuel burner means having a plurality of pulverized fuel passages alternating with air passages across said port, a plurality of fuel dispersal devices horizontally spaced across said port and each directly in the path of the discharge from a corresponding fuel passage, and each of said air passages being arranged to discharge a stream of air through the space between a corresponding pair of dispersal devices.

8. The combination with a furnace wall having a burner port formed therein and a plurality of flow obstructing devices horizontally spaced across said port, of a pulverized fuel burner arranged to discharge through said port and comprising a nozzle tip member having a plurality of horizontally spaced pulverized fuel nozzles having their discharge ends adjacent to and directly at the outer sides of corresponding obstructing devices, and an air supply casing associated with said tip member and communicating with the spaces between said obstructing devices.

9. The combination with a furnace wall having a burner port formed therein and a plurality of tubular fluid conduit elements spaced across said port, of a pulverized fuel burner arranged to discharge through said port and comprising a tip member having a plurality of spaced pulverized fuel nozzles having their discharge ends adjacent to and directly at the outer sides of corresponding conduit elements, and an air supply casing surrounding said tip member and communicating with the spaces between said conduit elements.

10. The combination with a furnace wall having a burner port formed therein and a plurality of tubular fluid conduit elements spaced across said port, of a fuel burner arranged to discharge through said port and comprising a tip member having alternating fuel and air passages, the discharge ends of said fuel passages being arranged adjacent to and directly at the outer sides of corresponding conduit elements and the discharge ends of said air passages being arranged in communication with the spaces between corresponding pairs of adjacent conduit elements, and an air supply casing surrounding said tip member and communicating with said air passages.

11. The combination with a furnace wall having a burner port formed therein, of a pulverized fuel burner arranged to discharge through said port and comprising a tip member having a plurality of pulverized fuel nozzles spaced across said port, a plurality of fuel dispersal devices spaced across said port and directly in the path of the discharge from corresponding fuel nozzles, an air supply casing associated with said tip member and arranged to discharge streams of air through the spaces between adjacent pairs of said dispersal devices, and means for shielding said dispersal devices and tip member from the radiant heat of the furnace.

12. The combination with a furnace wall having a burner port formed therein and a plurality of tubular fluid conduit elements spaced across said port, of a fuel burner arranged to discharge through said port and comprising a tip member having a plurality of fuel nozzles having elongated discharge ends terminating adjacent to and with their longitudinal axes parallel with the axes of corresponding conduit elements, an air supply casing associated with said tip member and communicating with the spaces between said conduit elements, and means between said fuel nozzles and corresponding conduit elements for receiving the impact of fuel discharged from said fuel nozzles and dispersing the fuel into the spaces between said conduit elements.

13. The combination with a furnace wall having a burner port formed therein and a plurality of wall tubes spaced across said burner port, of a fuel burner arranged to discharge through said burner port and comprising a plurality of spaced fuel nozzles having elongated discharge ends terminating adjacent to and spaced away from the outer side of and with their longitudinal axes in the same planes transverse to said wall as the axes of corresponding wall tubes, and means for supplying air for combustion to the burner port spaces between said wall tubes.

14. The combination with a furnace wall having a burner port formed therein and a plurality of wall tubes horizontally spaced across said burner port, of a pulverized fuel burner arranged to discharge through said burner port and comprising a tip member having a plurality of spaced pulverized fuel nozzles having elongated discharge ends terminating adjacent to and spaced away from the outer side of and with their longitudinal axes in the same vertical planes transverse to said wall as the axes of corresponding wall tubes, and means for supplying air for combustion to the burner port spaces between said wall tubes.

RALPH M. HARDGROVE.